United States Patent
Andrews et al.

(10) Patent No.: US 9,313,329 B2
(45) Date of Patent: Apr. 12, 2016

(54) VOICE RESPONSE SYSTEMS BROWSING

(75) Inventors: Peter J. Andrews, Mahopac, NY (US); Alexander Faisman, Croton-on-Hudson, NY (US); Genady Grabarnik, Scarsdale, NY (US); Larisa Shwartz, Scarsdale, NY (US)

(73) Assignee: International Business Machines Corporation, Armonk, NY (US)

(*) Notice: Subject to any disclaimer, the term of this patent is extended or adjusted under 35 U.S.C. 154(b) by 1027 days.

(21) Appl. No.: 12/610,646

(22) Filed: Nov. 2, 2009

(65) Prior Publication Data

US 2011/0103559 A1    May 5, 2011

(51) Int. Cl.
| | | |
|---|---|---|
| *H04M 1/64* | (2006.01) | |
| *H04M 3/493* | (2006.01) | |
| *H04M 1/725* | (2006.01) | |
| *H04M 3/42* | (2006.01) | |
| *H04M 3/533* | (2006.01) | |
| *H04M 11/06* | (2006.01) | |

(52) U.S. Cl.
CPC .......... *H04M 3/493* (2013.01); *H04M 1/72591* (2013.01); *H04M 3/42391* (2013.01); *H04M 3/533* (2013.01); *H04M 11/066* (2013.01); *H04M 2250/74* (2013.01)

(58) Field of Classification Search
CPC .................. H04M 2203/254; H04M 3/493
USPC ................ 379/52, 88.11, 88.01, 88.08, 8.17, 379/88.14; 455/563; 704/246
See application file for complete search history.

(56) References Cited

U.S. PATENT DOCUMENTS

| | | | |
|---|---|---|---|
| 5,475,835 A * | 12/1995 | Hickey | 725/109 |
| 5,499,288 A | 3/1996 | Hunt et al. | 379/88 |
| 5,793,964 A | 8/1998 | Rogers et al. | 395/200.32 |
| 5,802,526 A * | 9/1998 | Fawcett et al. | 379/88.13 |
| 5,855,020 A | 12/1998 | Kirsch | 707/10 |
| 5,995,590 A | 11/1999 | Brunet et al. | 379/52 |
| 6,091,805 A * | 7/2000 | Watson | 379/93.17 |
| 6,229,532 B1 | 5/2001 | Fujii | 345/327 |
| 6,263,364 B1 | 7/2001 | Najork et al. | 709/217 |
| 6,377,984 B1 | 4/2002 | Najork et al. | 709/217 |
| 6,546,082 B1 | 4/2003 | Alcendor et al. | 379/52 |
| 6,594,347 B1 * | 7/2003 | Calder | H04M 3/493 379/88.01 |
| 6,665,375 B1 | 12/2003 | Forlenza et al. | 379/52 |
| 6,714,963 B1 | 3/2004 | Levine et al. | 709/203 |
| 7,170,977 B2 * | 1/2007 | Doherty et al. | 379/52 |
| 7,177,402 B2 * | 2/2007 | Metcalf | 379/88.03 |
| 7,305,068 B2 * | 12/2007 | Tucker et al. | 379/88.11 |
| 7,437,287 B2 * | 10/2008 | Kim | 704/235 |
| 7,783,305 B2 * | 8/2010 | Ross et al. | 455/456.3 |
| 7,813,485 B2 * | 10/2010 | Yin | H04M 3/42382 348/14.04 |
| 8,000,454 B1 * | 8/2011 | Or-Bach et al. | 379/88.18 |

(Continued)

*Primary Examiner* — Van D Huynh
(74) *Attorney, Agent, or Firm* — Harrington & Smith (57) ABSTRACT

A method for voice browsing an integrated voice response server is described. The method includes visually displaying a representation of a choice tree for a service, where the service includes an audio menu of available actions. A selection of an action displayed in the representation is received. The method also includes automatically navigating the audio menu in order to initiate the selected action. Apparatus and computer readable media are also described.

19 Claims, 5 Drawing Sheets

(56) References Cited

U.S. PATENT DOCUMENTS

| | | | |
|---|---|---|---|
| 2002/0002039 A1* | 1/2002 | Qureshey et al. | 455/344 |
| 2003/0097262 A1* | 5/2003 | Nelson | 704/235 |
| 2003/0112931 A1* | 6/2003 | Brown et al. | 379/93.23 |
| 2004/0120484 A1* | 6/2004 | Buzbee | 379/93.17 |
| 2004/0185830 A1* | 9/2004 | Joao et al. | 455/410 |
| 2006/0179127 A1* | 8/2006 | Randall | H04M 19/04 709/219 |
| 2007/0116236 A1* | 5/2007 | Kargman | H04M 3/4938 379/221.11 |
| 2007/0135101 A1* | 6/2007 | Ramati et al. | 455/414.1 |
| 2008/0226042 A1* | 9/2008 | Singh | 379/88.04 |
| 2009/0154678 A1* | 6/2009 | Kewin et al. | 379/201.01 |
| 2009/0248419 A1* | 10/2009 | Spaulding et al. | 704/275 |
| 2012/0063574 A1* | 3/2012 | Or-Bach et al. | 379/88.23 |
| 2014/0056418 A1* | 2/2014 | Sheikh et al. | 379/88.01 |

* cited by examiner

VOICE RESPONSE SYSTEMS BROWSING

TECHNICAL FIELD

The exemplary and non-limiting embodiments of this invention relate generally to communication systems, methods, devices and computer programs and, more specifically, relate to voice browsing an integrated voice response server.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

There are over 200,000 Teletype devices (TTYs) in use in the US. TTYs are used by distinct groups of people. The first are those whose severe hearing impairment began at birth or in early childhood, before they acquired language. Many of these people refer to themselves as Deaf (with a capital letter) to indicate that they are members of a different culture, especially focusing on their use of American Sign Language. A second group consists of those people whose hearing loss is less severe, or who acquired their hearing impairment after they acquired language. They may use a TTY in concert with speech where possible. A third group includes those who do not have a hearing loss, but who, due to another disabling condition such as cerebral palsy, are not able to speak intelligibly. Some individuals in this latter group are also motor and mobility impaired.

These small TTY devices often have single line displays and keyboards. Baudot, an older telecommunications protocol often used in TTY devices, employs five bit frequency shift keying (FSK) and a mode character to shift from letters to numbers. It also uses half duplex where users alternate turns, with no simultaneous typing. A conventional "GA" (for "Go ahead") is typed to indicate that one's message is complete.

VMSs, as well as other commonly called services, often use multiple-choice selection trees. In the domain of telephony for service calls, multiple-choice selection trees have become common place. These trees may be navigated by touchpad or by voice, and they have benefited enterprises by allowing them to automate information gathering and the funneling of service calls. Unfortunately, users are often frustrated in a number of ways: They may not clearly hear or remember a full set of choices, and are thus, forcing them to listen to the entire set again; While one of the choices may be the one they are need, they may have a different key word in mind, necessitating listening to the list again to look for a variant term; They may mistype their choice or the system may not clearly hear their verbal response; They may be several layers deep into the tree before a problem becomes clear, necessitating going back several levels to remedy the problem; and/or Other users may not be able to use the service at all due to a disability or available equipment.

Existing telephony systems may also pose usability problems when users have to interact with a system using speech or tone interface. IVR systems may be based on a selection from menu, which has to be read to the user item by item (for example: "if you would like to talk to customer support press or say "1", if you would like to talk to services press or say "2", if you know the extension you are calling press or say "3", etc.). The fundamental difficulty of such interaction relates to the fact that many computer-based systems are menu-type choice oriented, but the user has only their voice and a dial up keyboard to interact with the system.

Figure 1:
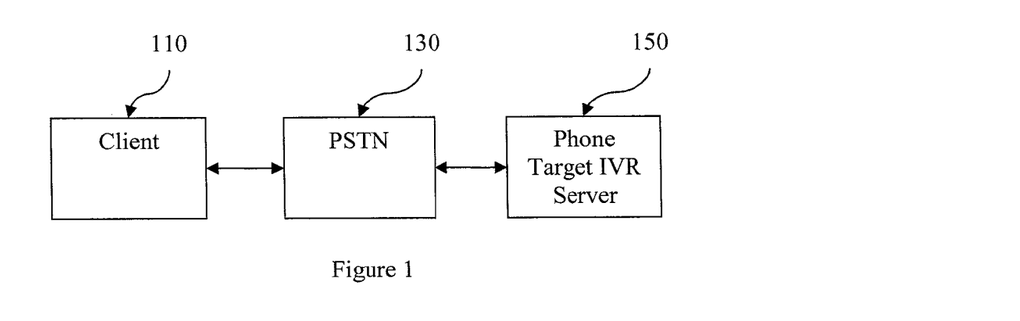
FIG. 1 shows a current arrangement for a client 110 to access a phone target integrated voice response (IVR) server 150 via the public switched telephone network (PSTN).

FIG. 1 shows a present arrangement for a client 110 to access a phone target integrated voice response (IVR) server 150 via the public switched telephone network (PSTN) 130.

Existing telephony systems often pose usability problems when users have to interact with the IVR system 150 using a speech or tone interface. This problem is aggravated when the user has a disability that interferes with using the system. Integrated voice response (IVR) systems often are based on a selection from a menu, which must be read to the user item by item. Existing solutions to this problem include teletype (TTY) access to public voice mail and audiotext/IVR systems directed to users with special needs and support for voice to voice interaction.

Telecommunications Relay Service (TRS) is an operator-assisted service between TTYs and voice telephones, mandated by the Americans with Disabilities Act. In many TRS calls, a deaf or hard of hearing person (typically using a TTY) dials a toll-free number and requests that a call be made to a hearing person (voice party). The TRS operator (e.g., a "communication assistant" or "CA") places the outbound call on a second line. The conversation between the TTY user and the voice party takes place with the assistance of the operator, who speaks the typed messages for the benefit of the voice party, and who types the spoken messages for the benefit of the TTY user.

There are two variants from the standard TRS call. In one variation, voice carryover (VCO), the TTY user communicates by speaking, but reads the reply from the CA on the display. This service is useful for those people who cannot hear phone conversation, but can speak and prefer to do so, and those who cannot type well. In another variation, called hearing carryover (HCO), the TTY user types a message (which is read off by the CA), but hears the spoken reply. This is useful for people who can hear and type but are speech impaired.

Currently, some TRS providers allow TTY users to access voice mail via a TRS call. However, this can be unsatisfactory to both the TTY user and the TRS provider. As with integrated voice response (IVR) systems, the rate of speech is often faster than the CA's typing speed. In this case, messages must be replayed to be fully transcribed, and the CA does not always have the ability to replay the message. This may result in loss of messages, loss of content, or multiple calls into the voice mail system (VMS) platform.

Many TTY users live in households with non-TTY users. This issue is one element of both the administrative and caller interfaces. There are five sub-issues:

a. TTY-only households with single mailboxes have no additional problems with the interface. They can use an integrated message. These households are most likely to operate TTYs without a voice telephone in parallel.

b. TTY-only households with multiple mailboxes need a method of prompting both their voice and TTY callers what to enter in order to put their message in the right mailbox. Callers reach a household menu, and must enter a DTMF digit to enter an individual mailbox. Currently this can be achieved through use of an integrated message. These households would have to create integrated messages for each mailbox, plus one for the household menu.

c. Mixed households with single mailboxes require a single integrated message.

d. Mixed households with multiple mailboxes have the same problem as b.

e. Households with distinctive ringing have an additional problem regarding its interoperation with voice mail. Not all switches forward the called number to the voice mail platform. Therefore the VMS is only aware of the called line's physical line number, and cannot provide a customized outgoing message. Also, the forwarding feature cannot be turned on and off on a per-number basis. This affects TTY users who may prefer to use their TTYs as answering machines: they must set their TTY ring count lower than the line's ring count in order to do so. There is currently no solution for this problem.

TTY users may also prefer to use their TTY keyboard for input, rather than DTMF from a telephone keypad. This is due to the fact that many TTY users do not keep a voice telephone in parallel with their TTY, and thus have no access to a DTMF keypad. Their request is to be able to drive the VMS menus from the TTY keyboard, using Baudot characters. Another solution is for more TTY manufacturers to add DTMF capabilities into their products. Many already have this feature for dialing the call in the first place, but cannot send DTMF once the call is placed.

TTY users report that they can place and receive TTY messages on some private voice mail systems (VMSs) without difficulty and on some systems with only occasional loss of characters but other systems are not accessible. Due to the non-error-correcting nature of the Baudot protocol, if a significant number of characters are lost in playback, the customer may be required to re-play the message in order to capture its meaning. If the errors enter during recording, there may not be a solution.

A few TTY-users currently use public voice mail systems without any TTY access features. For everyday use, they have learned to pace the menus by both counting and watching their line status indicators. Their problem is not with message storage and retrieval but with the user interface. System messages and prompts (e.g., how many new messages, message disposition, etc.) as well as the administrative interface (recording a new outgoing message, notification options, etc.) may be available only in spoken form.

Problems remain when customers receive a generic voice-only prompt. Thus there is a need to supply additional browsing options for an integrated voice response server.

SUMMARY OF THE INVENTION

The below summary section is intended to be merely exemplary and non-limiting.

The foregoing and other problems are overcome, and other advantages are realized, by the use of the exemplary embodiments of this invention.

An exemplary embodiment in accordance with this invention provides a method for voice browsing an integrated voice response server. The method includes visually displaying a representation of a choice tree for a service, where the service includes an audio menu of available actions. A selection of an action displayed in the representation is received. The method also includes automatically navigating the audio menu in order to initiate the selected action.

A further embodiment in accordance with this invention provides an apparatus for voice browsing an integrated voice response server. The apparatus includes a display configured to display a representation of a choice tree for a service, where the service includes an audio menu of available actions. An input configured to receive a selection of an action displayed in the representation is included. The apparatus also includes a processor configured to automatically navigating the audio menu in order to initiate the selected action.

An additional exemplary embodiment in accordance with this invention provides a computer readable medium for voice browsing an integrated voice response server. The computer readable medium is tangibly encoded with a computer program executable by a processor to perform actions. The actions include visually displaying a representation of a choice tree for a service, where the service includes an audio menu of available actions. A selection of an action displayed in the representation is received. The actions also include automatically navigating the audio menu in order to initiate the selected action.

A further exemplary embodiment in accordance with this invention provides an apparatus for voice browsing an integrated voice response server. The apparatus include means for visually displaying a representation of a choice tree for a service, where the service includes an audio menu of available actions. Means for receiving a selection of an action displayed in the representation is included. The apparatus also includes means for automatically navigating the audio menu in order to initiate the selected action.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION OF THE INVENTION

Telephone query tree system may have a multi-language capability, allowing different sets of voice prompts for different language-preference users, and may be able to exploit this feature to provide TTY prompts. These systems are available as both ANI-driven, allowing for service from a single platform via a single access number and a subscriber database; and DNIS-driven, using a separate access number.

Baudot, like spoken languages, is based on audio files. No carrier is present and there is no handshaking procedure. While certain examples are provided using the Baudot system, exemplary embodiments in accordance with this invention may also be used with other formats.

Various exemplary embodiments in accordance with this invention provide text, image and video versions of information that is currently supplied by audio in IVR systems. The information for these text, image and video representations may be delivered via an audio file (for example, a blirp) when contacting the service. Additionally, users may subscribe to a system which provides such information.

Alternatively, the system may crawl a telephone query tree system of a service which is audio based (for example, by sequentially selecting all possible options). Using speech recognition, the system may determine the meaning of the instructions provided audibly. This instructional information may then be converted into a message signal (e.g., a data signal, a compact audio signal or a blirp), and transmitted to the subscriber's phone. The message signal may be converted by the phone as needed (e.g., during a transaction with the service), for example, so that selections are turned into a diagram with text and hot buttons on the phone's display.

The graphical representation of the telephone query tree (also referred to as a choice tree) allows the user to more quickly navigate through the tree since the information is shown on the display rather than be provided sequentially via an audio menu. It would also provide an effective alternative for hearing impaired users. These message signals may be provided, stored and refreshed automatically as a background activity during the phone's use or, in the case of a contacting new number, delivered in real-time. Other uses, such as providing blirps for collectable and tradable images, could also be provided.

The user interface can be modeled from computer-based interaction (e.g., visual menus, windows, scroll bars, etc) which is implemented and used with existing phone lines and with existing phones. Additionally, due to the proliferation of video displays with phones, implementation may be further facilitated.

Integrated messages may be provided which contain both message signals and voice content in such a way that both voice and message signals can be provided from a single audio file. This avoids potential voice recognition failures. An exemplary construction using (as a non-limiting example) Baudot is as follows:

1. The Baudot letters "HD" or "HLD" (which are understood by TTY users to mean "Hold") are used at the start of the message. This will secure the attention of any TTY users, while being short enough (less than 0.5 seconds) not to confuse or inconvenience hearing callers.
2. Next is a standard voice message (which may or may not prompt a DTMF reply). One option is to advise hearing callers to enter a DTMF digit to bypass the Baudot.
3. The voice message is followed by a pause sufficient to convince hearing callers that there is no more information to be heard, approximately 5 seconds. Presumably hearing callers will reply or hang up.
4. Then, an appropriate transcription of the voice message is provided in Baudot.

Integrated messages can be constructed by using both a TTY and a voice telephone on the same line, or by editing the two separate audio sources into one file. This may extend the duration of the message. Repeating or cycling of the message may be required in some contexts.

A voice browse server may be configured to receive a request from a client to call an integrated voice response (IVR) server that offers a set of selections and corresponding responses. The voice browse server connects to the IVR server, and interrogates the IVR server to create a menu tree based on the set of selection and corresponding responses. The voice browse server then transmits the menu tree to the client, and later receives menu tree instructions from the client. The voice browse server then converts the menu tree instructions received from the client to instructions that are recognized by the IVR server and transmits these latter instructions to the IVR server.

Figure 2:
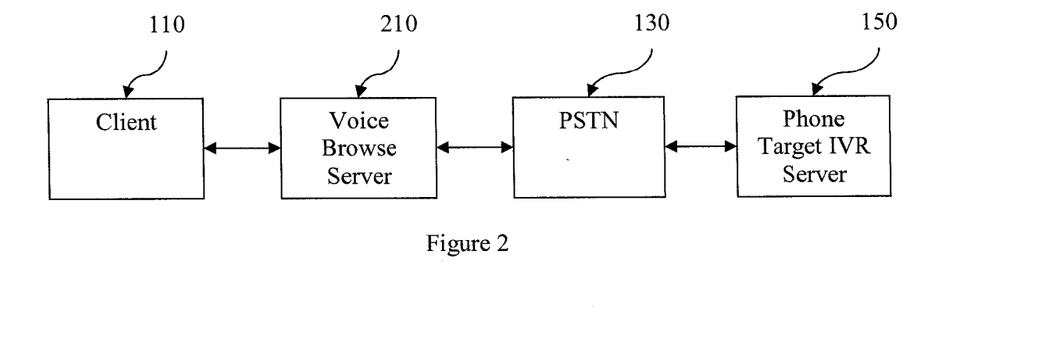
FIG. 2 shows a client arranged to access a phone target IVR server via the present voice browse server 210.

Referring now to FIG. 2 there is shown a client arranged to access a phone target IVR server via the present voice browse server 210. As shown, the client 110 accesses the PSTN and the IVR server 150 by means of the present voice browse server 210.

Various exemplary embodiments in accordance with this invention may use a predefined registry of phone numbers to dial in and discover the structure of a voice menu (e.g., by voice crawling) rather than relying on potentially out-dated information. The voice menu may be discovered by voice browsing and transformed from voice into a visual or textual format. Once discovered, the voice menu may also be stored and recalled at a later time in order to be quickly updated.

Telephony choices are thus exposed as a sequence (e.g., voice resource locator (VRL)), as a hierarchy, as a graphical presentation (e.g., a web page), an audio presentation and/or a combined representation/special presentation (also known as a blirp). These representations allow the user to define a path through the hierarchy and to outsource actions, e.g., dialing, to the agent/voice browse server. The process may notify to the user upon completion of the task or partial task, thus redirecting control back to the user and allowing the user to finish the rest of the task.

The VRL repository of tree information may be created by a crawl of popular telephone numbers that include choice trees (e.g., telephone numbers of service companies and government agencies—cable firms, power companies, device repair companies, hospital billing agencies, investment firms, vehicle registration and licensing agencies, etc.). When a user dials a selected phone number included in the crawl (or a specific number that a subscriber enters after dialing the service), this may initiate sending a message signal, e.g., a blirp, to the user's phone. Subsequently, this message signal is converted into a diagram and displayed on the user's phone.

The user can then use this tree information to make selections with a cursor or by touch. These selections are transmitted back to the service. The system then takes the full selection of choices, calls the service number, makes appropriate choices on behalf of the user and calls the user to confirm completion and/or to connect the user with a representative, depending on the normal results of the service's process. Alternatively, blirps may be sent regularly to the system and stored for use before contact with the service is made.

The addition of VRL repository information may be initiated by a scheduled crawl of the selected phone numbers or by the entering of a specific phone number by a subscriber. The system interrogates the full set of choices (for example by serially making all possible selections) and captures the voice message for each choice. Next, the system sorts the results of the interrogation to create a hierarchical tree. Regularly used choice trees may be stored in memory, and updated as appropriate.

Using voice recognition technology, the voice messages may be converted into text and then inserted into the proper place in a diagram of the whole tree, which may be stored in the repository. The quality of the voice recognition technology on the voice prompts may be significantly higher than average voice recognition quality as voice prompts for audio menus are created to be clear and to be easily understood.

In various embodiments, the menu tree information is presented on a display screen or a touch-sensitive screen. The user makes a selection either by selecting an action with a cursor or by touching the correct part of the touch-sensitive screen. A choice tree may be transformed into a web page that allows the choice of any action in the hierarchy or a TTY message.

A menu tree may consists of a root, interior nodes and leaves. The root may represent the initial point of communication (e.g., a welcome message, etc.). Each interior node may represent a stage in the call where a list of options is presented. Selection of an option may move the caller to a new interior node or to a leaf node. The leaf nodes may represent actions that end the call, or require user attention, for example, speaking with a service representative.

Figure 3A:
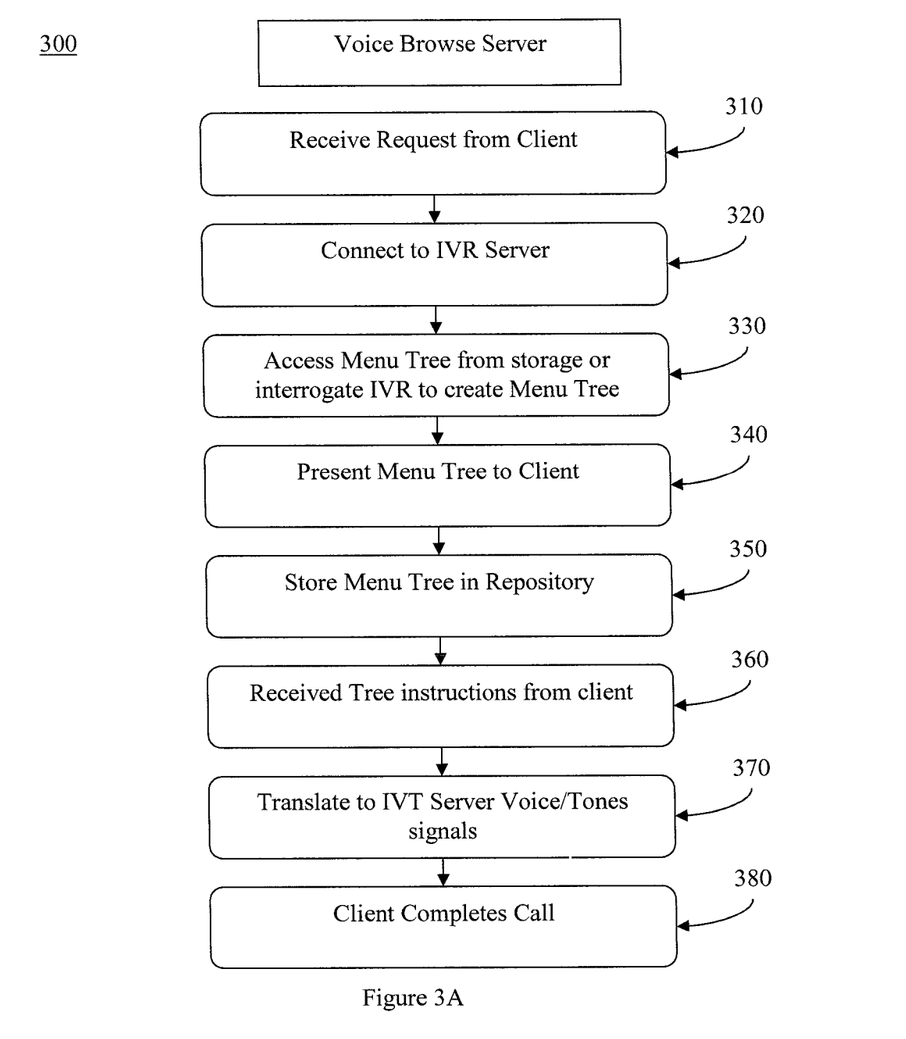
FIGS. 3A-3B show a flow diagram for the voice browse server 210 to facilitate a client to access the IVR server 150.
Figure 3B:
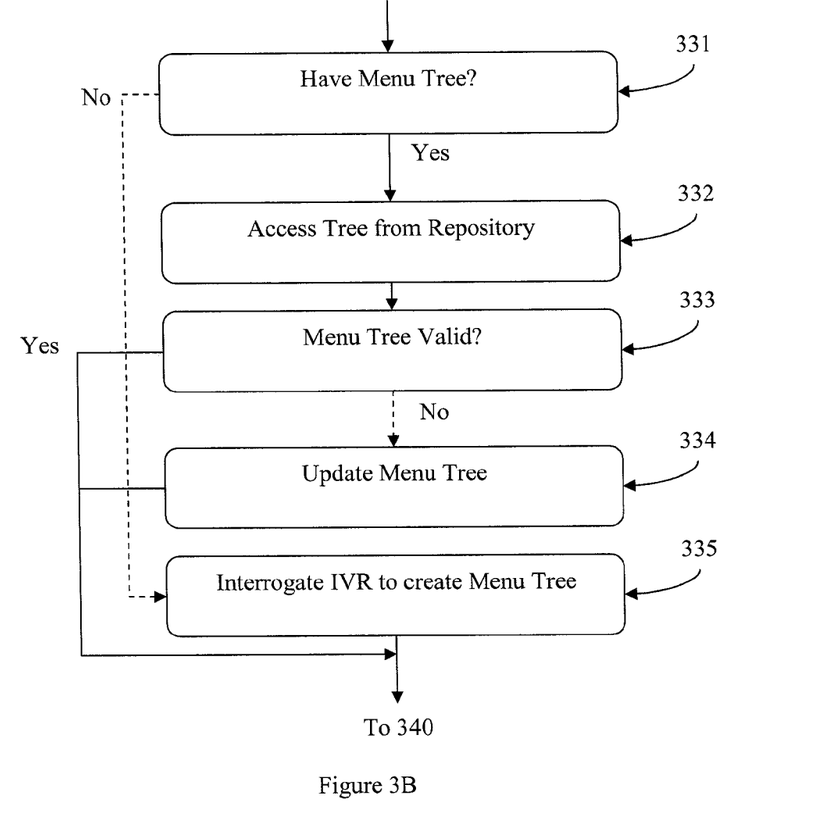

Referring now to FIGS. 3A-3B there is shown a flow diagram 300 for the voice browse server 210 to facilitate a client to access the IVR server 150.

In FIG. 3A, at step 310, the browser receives a request from the client. In step 320, the browser connects to the IVR server. In step 330, the browser either accesses the IVR server menu tree from storage or else interrogates the IVR to create the menu tree.

Step 330 is shown in more detail in FIG. 3B. The browser determines whether it has the needed menu tree in a storage repository in step 331. If the answer is no, the browser goes directly to step 335. Otherwise, if the answer is yes, the browser retrieves the menu tree from the repository, at step 332. Upon accessing the menu tree from repository, the browser tree determines if the menu tree is valid, step 333. If the answer is yes, the browser goes directly to step 340. Otherwise, if the answer is no, the browser updates the menu tree, step 334, and then proceeds to step 340. In various embodiments, the menu tree is updated by interrogating the IVR server 150. Returning again to step 331, if the browser does not have the menu tree in a storage repository, the process goes to step 335, where the browser interrogates the IVR to create the menu tree, and then goes to step 340, in FIG. 3A.

Figure 8:
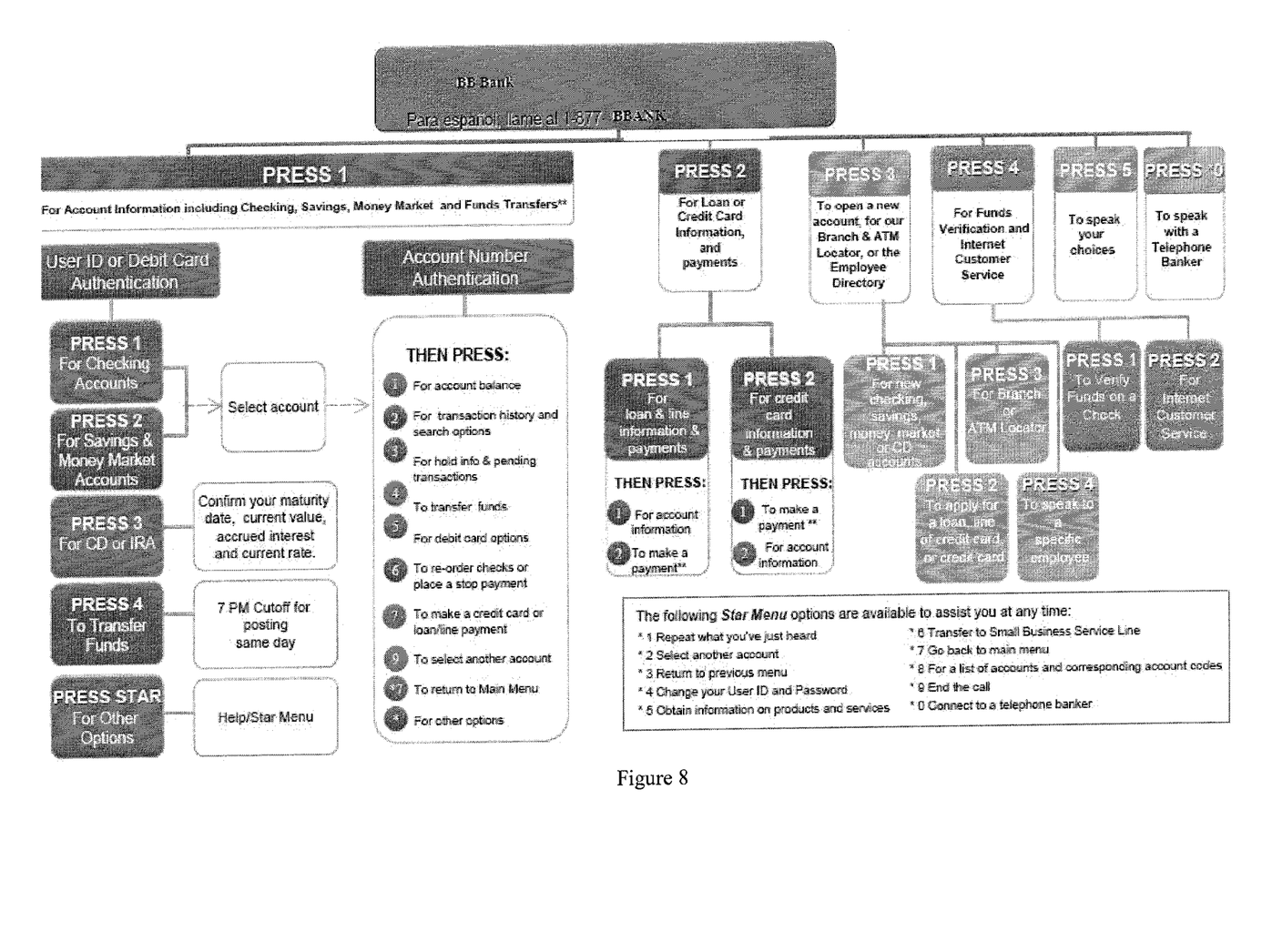
FIG. 8 shows a sample menu tree.

Referring again to FIG. 3A, in step 340, the process presents the menu tree to the client (for example, the sample menu tree shown in FIG. 8). In step 350, if the menu tree has been newly-updated (e.g., as shown in step 334) or else newly created (e.g., as shown in step 335), the memory tree is stored in the storage repository.

In step 360, menu tree instructions are received from the client. In various embodiments, the client makes a menu tree selection by either touching the correct portion of a touch-sensitive screen, or else uses an appropriate input device (e.g., a mouse or keyboard) to select the correct instruction. In step 370, the browser translates the client instructions to appropriate voice signals, tone signals, or both, and then transmits these signals to the IVR server. In step 380, the client proceeds to complete the call with the IVR server.

Figure 4:
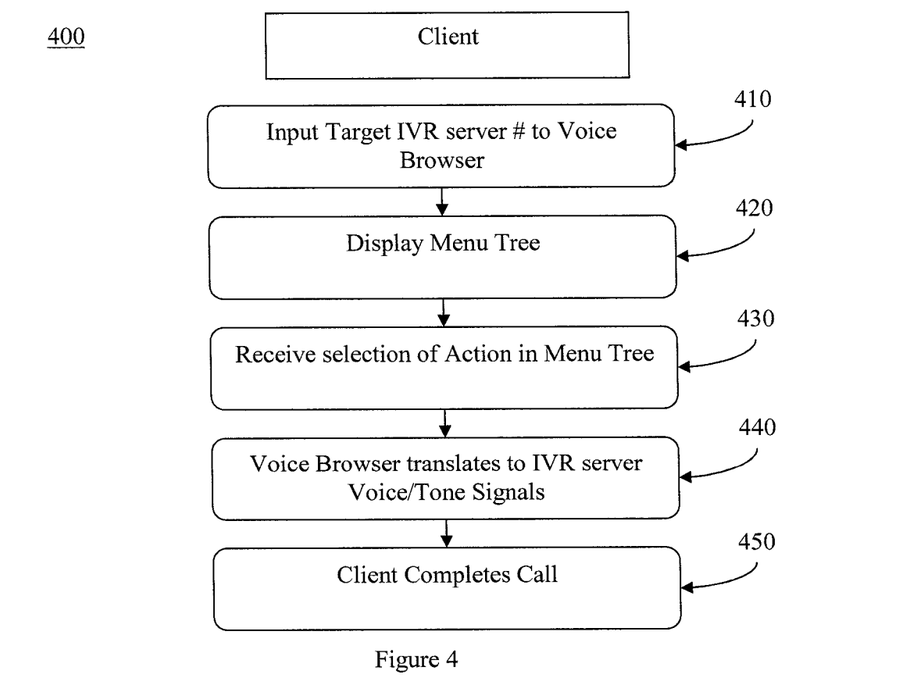
FIG. 4 is a flow diagram for a client 110 to access the IVR server by means of the voice browse server 210.

Referring to FIG. 4, there is shown a flow diagram 400 for the client. In step 410, the client indicates the phone number for the target IVR server 150 to the voice browser server 210 (e.g., by dialing the number or selecting the number from a list). In step 420, the menu tree of the target IVR server 150 is displayer. In step 430, the client selects the desired action from the menu tree (for example, by using a touch screen or cursor). In step 440, the voice browser generates signals according to the client's selection. These signals may be voice signals, tone signals, or both. In step 450, the client completes the call.

Figure 5:
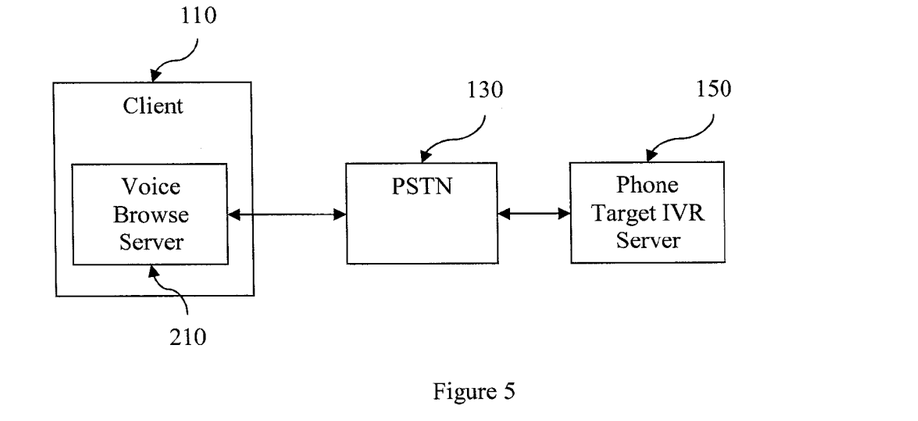
FIG. 5 shows the client 110 arranged with the voice browse server 210.
Figure 6:
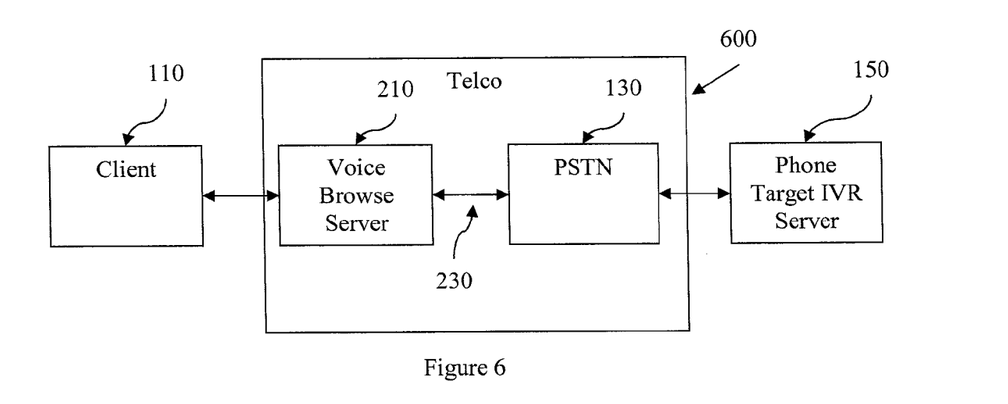
FIG. 6 shows a telephone service provider 600 arranged with the voice browse server 210.

FIG. 5 demonstrates one embodiment where the client 110 hosts the voice browse server 210, for example, as part of the client's equipment. In FIG. 6, there is shown an additional embodiment where the client's telephone service provider 600 maintains the voice browse server 210 as part of the telephone service provider's own equipment.

Figure 7:
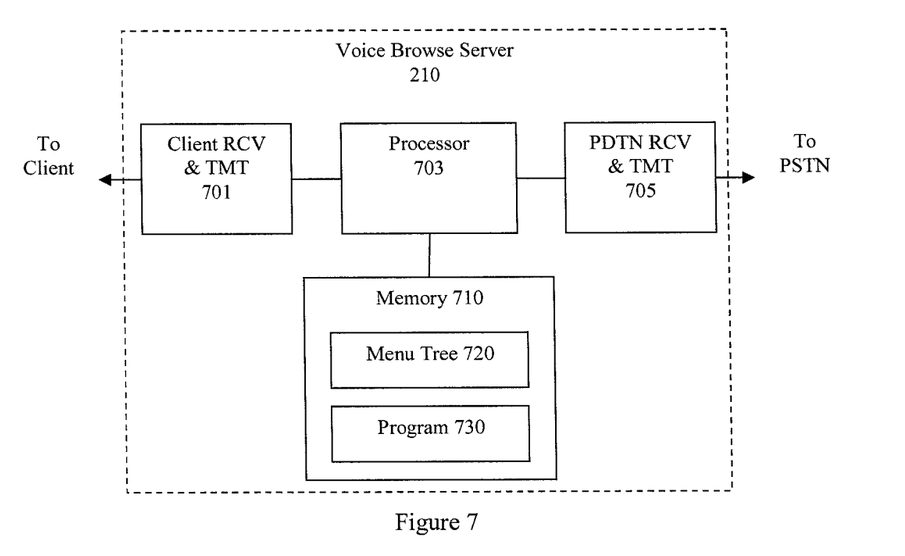
FIG. 7 shows detail of the voice browse server 210.

In FIG. 7 a block diagram of the voice browse server 210 is shown. As shown, the server 210 includes a client receive and transmit apparatus 701 (e.g., a wireless transceiver, a network interface, etc.), a PSTN receive and transmit apparatus 705 (a wireless transceiver, a network interface, etc.), a processor unit 703, and a memory 710. The memory 710 is configured to store a repository 720 for storing one or more menu trees, and also a computer program 730 of computer readable instructions executable by the processor unit 703 to control the voice browse server 210. Moreover, exemplary embodiments in accordance with this invention may concentrate on well-spoken menu/voice prompts and, thus, may incorporate speech recognition software, hardware or a combination of software and hardware.

The memory 710 may be of any type suitable to the local technical environment and may be implemented using any suitable data storage technology, such as semiconductor based memory devices, flash memory, magnetic memory devices and systems, optical memory devices and systems, fixed memory and removable memory. The processor unit 703 may be of any type suitable to the local technical environment, and may include one or more of general purpose computers, special purpose computers, microprocessors, digital signal processors (DSPs) and processors based on a multicore processor architecture, as non-limiting examples.

An exemplary embodiment in accordance with this invention provides a method for voice browsing an integrated voice response server. The method includes visually displaying a representation of a choice tree for a service, where the service includes an audio menu of available actions. A selection of an action displayed in the representation is received. The method also includes automatically navigating the audio menu in order to initiate the selected action.

In a further exemplary embodiment of the method above, the method also includes receiving the representation.

In an additional exemplary embodiment of the method above, receiving the representation includes initiating contact with the service; and navigating through the audio menu in order to identify a structure of the audio menu and all actions available via the audio menu.

In a further exemplary embodiment of the method above, identifying the structure of the audio menu includes receiving an audio message including an identification of available choices, performing voice recognition on the audio message in order to identify the available choices and analyzing the available choices in order to determine the structure of the audio menu and the available actions.

In an additional exemplary embodiment of the method above, identifying the structure of the choice tree includes receiving a message signal including an identification of the structure of the audio menu and the available actions.

In a further exemplary embodiment of any one of the methods above, automatically navigating the choice tree includes, in response to receiving a prompt for a selection of a choice from the audio menu, generating, by a computer, a response and transmitting the response.

In an additional exemplary embodiment of the method above, the response is an audio message.

In a further exemplary embodiment of any one of the methods above, automatically navigating the choice tree includes, in response to the selected action being initiated, alerting a user.

In an additional exemplary embodiment of any one of the methods above, visually displaying the representation includes visually displaying a representation on a screen associated with a telephony device.

A further embodiment in accordance with this invention provides an apparatus for voice browsing an integrated voice response server. The apparatus includes a display configured to display a representation of a choice tree for a service, where the service includes an audio menu of available actions. An input configured to receive a selection of an action displayed in the representation is included. The apparatus also includes a processor configured to automatically navigating the audio menu in order to initiate the selected action.

In an additional exemplary embodiment of the apparatus above, the apparatus also includes an interface configured to receive the representation.

In a further exemplary embodiment of the apparatus above, where the interface is configured to initiate contact with the service; and to navigate through the audio menu in order to identify a structure of the audio menu and all actions available via the audio menu.

In an additional exemplary embodiment of the apparatus above, the processor is configured to receive, via the interface, an audio message including an identification of available choices, to perform voice recognition on the audio message in order to identify the available choices and to analyze the available choices in order to determine the structure of the audio menu and the available actions.

In a further exemplary embodiment of the apparatus above, the processor is configured to receive a message signal including an identification of the structure of the audio menu and the available actions.

In an additional exemplary embodiment of any one of the apparatus above, the processor is configured, in response to receiving a prompt for a selection of a choice from the audio menu, to generate, a response and to transmit the response. The response may be an audio message.

In a further exemplary embodiment of any one of the apparatus above, the processor is configured, in response to determining the selected action being initiated, to alert a user.

In an additional exemplary embodiment of any one of the apparatus above, the display and input are a touch screen display.

A further exemplary embodiment in accordance with this invention provides a computer readable medium for voice browsing an integrated voice response server. The computer readable medium is tangibly encoded with a computer program executable by a processor to perform actions. The actions include visually displaying a representation of a choice tree for a service, where the service includes an audio menu of available actions. A selection of an action displayed in the representation is received. The actions also include automatically navigating the audio menu in order to initiate the selected action.

In an additional exemplary embodiment of the computer readable medium above, the actions also include receiving the representation.

In a further exemplary embodiment of the computer readable medium above, receiving the representation includes initiating contact with the service; and navigating through the audio menu in order to identify a structure of the audio menu and all actions available via the audio menu.

In an additional exemplary embodiment of the computer readable medium above, identifying the structure of the audio menu includes receiving an audio message including an identification of available choices, performing voice recognition on the audio message in order to identify the available choices and analyzing the available choices in order to determine the structure of the audio menu and the available actions.

In a further exemplary embodiment of the computer readable medium above, identifying the structure of the choice tree includes receiving a message signal including an identification of the structure of the audio menu and the available actions.

In an additional exemplary embodiment of any one of the computer readable media above, automatically navigating the choice tree includes, in response to receiving a prompt for a selection of a choice from the audio menu, generating, by a computer, a response and transmitting the response. The response may be an audio message.

In a further exemplary embodiment of any one of the computer readable media above, automatically navigating the choice tree includes, in response to the selected action being initiated, alerting a user.

In an additional exemplary embodiment of any one of the computer readable media above, visually displaying the representation includes visually displaying a representation on a screen associated with a telephony device.

A further exemplary embodiment in accordance with this invention provides an apparatus for voice browsing an integrated voice response server. The apparatus include means for visually displaying a representation of a choice tree for a service, where the service includes an audio menu of available actions. Means for receiving a selection of an action displayed in the representation is included. The apparatus also includes means for automatically navigating the audio menu in order to initiate the selected action.

In an additional exemplary embodiment of the apparatus above, the apparatus also includes means for receiving the representation.

In a further exemplary embodiment of the apparatus above, the means for receiving the representation includes means for initiating contact with the service; and means for navigating through the audio menu in order to identify a structure of the audio menu and all actions available via the audio menu.

In an additional exemplary embodiment of the apparatus above, the means for identifying the structure of the audio menu includes means for receiving an audio message including an identification of available choices, means for performing voice recognition on the audio message in order to identify the available choices and means for analyzing the available choices in order to determine the structure of the audio menu and the available actions.

In a further exemplary embodiment of the apparatus above, the means for identifying the structure of the choice tree includes means for receiving a message signal including an identification of the structure of the audio menu and the available actions.

In an additional exemplary embodiment of any one of the apparatus above, the means for automatically navigating the choice tree includes means for, in response to receiving a prompt for a selection of a choice from the audio menu, generating a response and means for transmitting the response. The response may be an audio message.

In a further exemplary embodiment of any one of the apparatus above, the means for automatically navigating the choice tree includes means for in response to the selected action being initiated, alerting a user.

In an additional exemplary embodiment of any one of the apparatus above, the means for visually displaying the representation includes means for visually displaying a representation on a screen associated with a telephony device.

In a further exemplary embodiment of any one of the apparatus above, the means for visually displaying is a display, the means for receiving a selection is one of: a keyboard, a touch screen and a select wheel, and the means for automatically navigating the audio menu is a processor.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

The invention claimed is:

1. A method performed by a data processor that executes computer program code stored in a non-transitory computer readable media to perform a series of operations, the operations comprising:
   visually displaying a graphical representation of a telephone query tree that comprises a multi-stage audio menu of a service,
   where the displayed graphical representation comprises a plurality of available actions configured to be selectable by a user who calls the service,
   where each stage of the multi-stage audio menu is associated with a list of choices presented audibly,
   where each list of choices comprises at least one of:
   a choice to perform one of the available actions and a choice to navigate to another stage of the multi-stage audio menu,
   where the graphical representation of the telephone query tree comprises a root node, a plurality of interior nodes and at least one leaf node,
   where the root node indicates an initial point of the user's communication with the service,
   where each interior node is associated with a stage in the multi-stage audio menu, and
   where each leaf node is associated with one of:
   an available action that ends the user's call to the service or an available action that requires user attention;
   receiving, at the data processor, a selection of a leaf node made by the user; and
   determining, by the data processor, a series of choices which result in navigating through the multi-stage audio menu in order to initiate the available action associated with the selected leaf node;
   navigating, by the data processor on behalf of the user, the audio menu in accordance with the determined series of choices, and
   one of, confirming to the user a completion of the navigation of the audio menu on behalf of the user, and connecting, based on the completion of the navigation, the user to a representative of the service,
   where determining the series of choices and navigating comprise translating the user's selection to appropriate voice signals and tone signals and transmitting the voice signals and tone signals to the service.

2. The method of claim 1, where the operations further comprise:
   initiating, by the data processor, contact with the service; and
   navigating, by the data processor, through the audio menu in order to identify a structure of the audio menu and all actions available via the audio menu.

3. The method of claim 2, where identifying the structure of the audio menu comprises:
   receiving, at the data processor, an audio message comprising an identification of available choices;
   performing, by the data processor, voice recognition on the audio message in order to identify the available choices; and
   analyzing, by the data processor, the available choices in order to determine the structure of the audio menu and the available actions.

4. The method of claim 2, where identifying the structure of the audio menu comprises receiving a message signal comprising an identification of the structure of the audio menu and the available actions.

5. The method of claim 1, where navigating the audio menu comprises:
   in response to receiving a prompt for a selection of a choice from the audio menu, generating, by a computer, a response; and
   transmitting the response.

6. The method of claim 5, where the response is an audio message.

7. The method of claim 1, where navigating the audio menu comprises, in response to the selected action being initiated, alerting a user.

8. The method of claim 1, where visually displaying the graphical representation of the telephone query tree comprises visually displaying the graphical representation on a screen associated with a telephony device.

9. The method of claim 1, where the operations further comprise:
   receiving, by the data processor, an audio message comprising an identification of available choices for a stage in the multi-stage audio menu;
   performing, by the data processor, voice recognition on the audio message in order to identify the available choices for the stage in the audio menu;
   for each available choice, selecting, by the data processor, the available choice and converting, by the data processor, a voice message for the available choice into a text message;
   analyzing, by the data processor, the available choices in order to determine the structure of the audio menu; and
   generating, by the data processor, a representation of the telephone query tree based on the determined structure, where the representation comprises the text message for each of the available choices.

10. An apparatus comprising:
    a display configured to visually display a graphical representation of a telephone query tree that comprises a multi-stage audio menu of a service, where the displayed graphical representation comprises a plurality of available actions configured to be selectable by a user who calls the service, where each stage of the multi-stage audio menu is associated with a list of choices presented audibly, where each list of choices comprises at least one of: a choice to perform one of the available actions and a choice to navigate to another stage of the multi-stage audio menu, where the graphical representation of the telephone query tree comprises a root node, a plurality of interior nodes and at least one leaf node, where the root node indicates an initial point of the user's communication with the service, where each interior node is associated with a stage in the multi-stage audio menu, and where each leaf node is associated with one of:

an available action that ends the user's call to the service or an available action that requires user attention;

an input configured to receive a selection of a leaf node made by the user;

a processor configured to determine a series of choices which result in navigating through the multi-stage audio menu on behalf of the user in order to initiate the available action associated with the selected leaf node and to navigate, on behalf of the user, the audio menu in accordance with the determined series of choices, and one of, confirming to the user a completion of the navigation of the audio menu on behalf of the user, and connecting, based on the completion of the navigation of the audio menu by the data processor, the user to a representative of the service, where the processor determining the series of choices which result in navigating through the multi-stage menu comprises the processor translating the user's selection to appropriate voice signals and tone signals and transmitting the voice signals and tone signals to the service.

11. The apparatus of claim 10, further comprising an interface configured:
to initiate contact with the service; and
to navigate through the audio menu in order to identify a structure of the audio menu and all actions available via the audio menu.

12. The apparatus of claim 10, further comprising an interface configured:
to receive an audio message comprising an identification of available choices, via the interface;
to perform voice recognition on the audio message in order to identify the available choices; and
to analyze the available choices in order to determine the structure of the audio menu and the available actions.

13. The apparatus of claim 10, where the processor is configured, in response to determining the selected action being initiated, to alert a user.

14. A non-transitory computer readable medium tangibly encoded with a computer program executable by a processor to perform operations comprising:
visually displaying a graphical representation of a telephone query tree that comprises a multi-stage audio menu of a service,
where the displayed graphical representation comprises a plurality of available actions configured to be selectable by a user who calls the service,
where each stage of the multi-stage audio menu is associated with a list of choices presented audibly, where each list of choices comprises at least one of:
a choice to perform one of the available actions and a choice to navigate to another stage of the multi-stage audio menu,
where the graphical representation of the telephone query tree comprises a root node, a plurality of interior nodes and at least one leaf node,
where the root node indicates an initial point of the user's communication with the service, where each interior node is associated with a stage in the multi-stage audio menu, and
where each leaf node is associated with one of:
an available action that ends the user's call to the service or an available action that requires user attention;
receiving, at the data processor, a selection of a leaf node made by the user; and
determining, by the data processor, a series of choices which result in navigating through the multi-stage audio menu in order to initiate the available action associated with the selected leaf node;
navigating, by the data processor on behalf of the user, the audio menu in accordance with the determined series of choices, and
one of, confirming to the user a completion of the navigation of the audio menu on behalf of the user, and connecting, based on the completion of the navigation, the user to a representative of the service,
where determining the series of choices and navigating comprise translating the user's selection to appropriate voice signals and tone signals and transmitting the voice signals and tone signals to the service.

15. The computer readable medium of claim 14, where the operations further comprise:
querying a storage repository to determine if the repository contains the representation of the telephone query tree and, if it does not, then
initiating contact with the service and generating the representation of the telephone query tree based on audio messages received from the service when presenting the multi-stage audio menu.

16. The computer readable medium of claim 15, where:
initiating contact with the service comprises calling the service to initiate voice contact with the service; and
navigating through the audio menu in order to identify a structure of the audio menu and all actions available via the audio menu.

17. The computer readable medium of claim 16, where identifying the structure of the audio menu comprises:
receiving an audio message comprising an identification of available choices;
performing voice recognition on the audio message in order to identify the available choices; and
analyzing the available choices in order to determine the structure of the audio menu and the available actions.

18. The computer readable medium of claim 14, where navigating the audio menu comprises:
in response to receiving a prompt for a selection of a choice from the audio menu, generating, by the data processor, a response; and
transmitting the response.

19. The computer readable medium of claim 14, where navigating the audio menu comprises, in response to the selected action being initiated, alerting a user.

* * * * *